United States Patent [19]

Yamase

[11] Patent Number: 5,117,454
[45] Date of Patent: May 26, 1992

[54] EXCHANGE HAVING A DISPLAY APPARATUS FOR DISPLAYING CALLS TERMINATED AT AN ATTENDANT CONSOLE

[75] Inventor: Shinji Yamase, Fukuoka, Japan
[73] Assignee: Fujitsu Limited, Kawasaki, Japan
[21] Appl. No.: 659,505
[22] Filed: Feb. 22, 1991

[30] Foreign Application Priority Data

Feb. 26, 1990 [JP] Japan .................................. 2-44991

[51] Int. Cl.[5] .......................... H04M 5/04; H04M 5/08
[52] U.S. Cl. .................................. 379/262; 379/267; 379/376; 379/396; 379/263; 379/164
[58] Field of Search ............... 379/156, 104, 105, 162, 379/163, 164, 165, 251, 252, 262, 263, 267, 308, 376, 396, 245, 247

[56] References Cited

U.S. PATENT DOCUMENTS 4,280,022  7/1981  Sekiguchi et al. .................... 379/162

Primary Examiner—Stafford D. Schreyer
Attorney, Agent, or Firm—Staas & Halsey

[57] ABSTRACT

An exchange having a display apparatus for displaying the states of a plurality of subscriber terminals accommodated therein. The display apparatus includes a display board having n indicator-keys, each for displaying the state of a subscriber terminal and an indication board having m indicator-keys, each for selectively indicating the states of n groups of subscriber terminals so that the states of a total of n×m subscriber terminals are displayed. Under control of the exchange, the display apparatus displays an incoming call and a recall terminated at an attendant console by lighting up the indicator-keys and flickering the indicator keys on and off, respectively. When an indicator-key which is displaying an incoming call or a recall is pressed, the subscriber terminal and the station line concerned are connected.

25 Claims, 13 Drawing Sheets

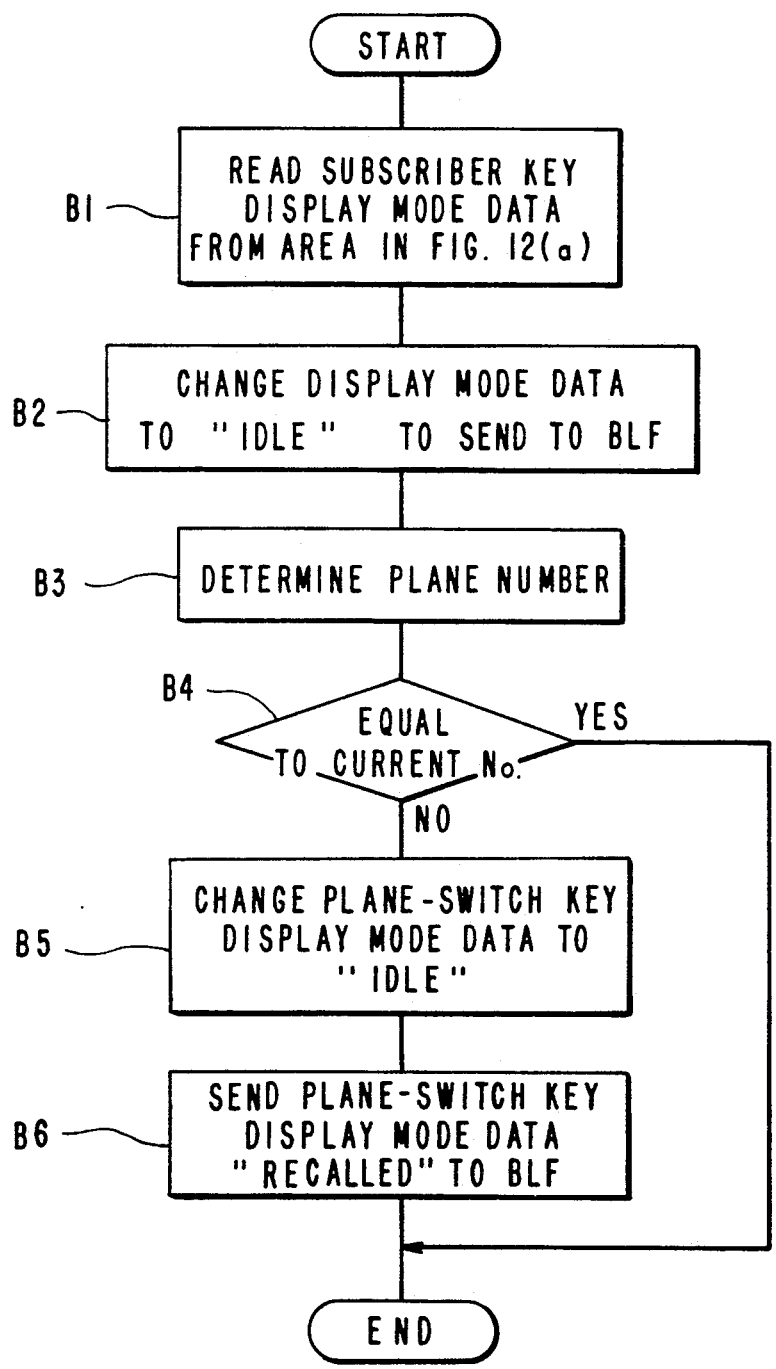

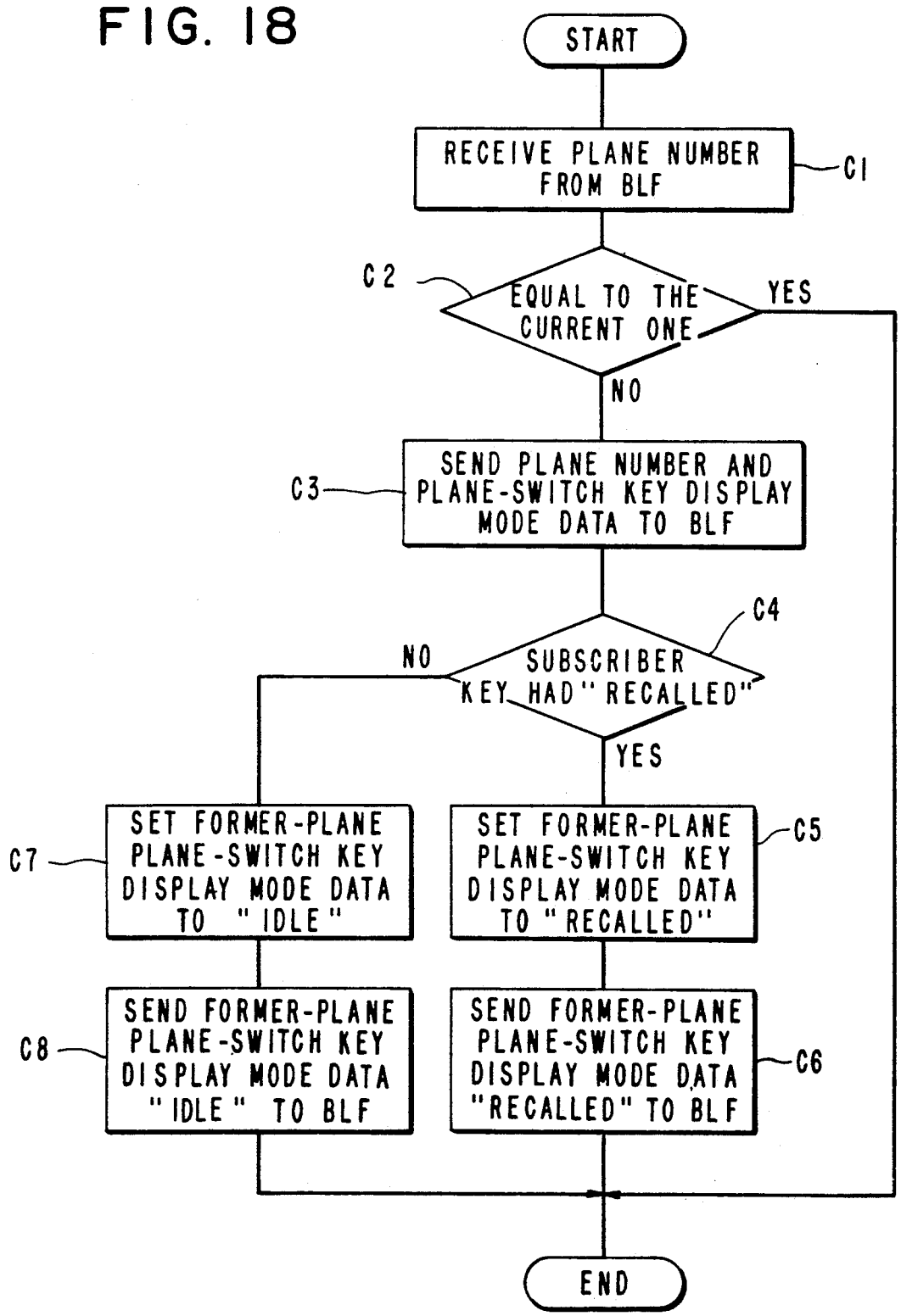

EXCHANGE HAVING A DISPLAY APPARATUS FOR DISPLAYING CALLS TERMINATED AT AN ATTENDANT CONSOLE

BACKGROUND OF THE INVENTION

1. Field of the Invention

The present invention relates to a display apparatus, or more particularly to a busy lamp field for displaying the state of a subscriber terminal accommodated in an exchange, and for connecting a call from a station terminal to the subscriber terminal.

2. Description of the Related Art

In recently developed electronic exchange systems (e.g., a private branch exchange or PBX), a busy lamp field (hereinafter called BLF) is widely used to display the subscriber state (e.g., an idle state and called and recalled states as explained below) of a plurality of subscriber terminals or telephones (hereinafter called subscribers or SUB) accommodated in the exchange. The BLF is also used by an operator to connect a call originated from a station terminal to a subscriber.

Accordingly, a BLF that can effectively display the subscriber state and can connect a plurality of calls to the subscribers in an arbitrary order, is in great demand.

FIG. 1 is a block diagram of an electronic exchange system as described above. A PBX 2 accommodates a plurality of subscribers 1-i (where i=1, 2, ..., mn) and is equipped with an attendant console 4 (hereinafter called ATT) and a busy lamp field 3 (BLF) which is usually provided near the ATT 4. The ATT 4 is used by an operator to connect a called subscriber 1-i or a subscriber in the recalled state 1-i (explained below) to an incoming call from a calling station terminal 9 via an incoming trunk 8.

For a PBX 2 accommodating a small number (n) of subscribers 1-i, a BLF 3 with only a subscriber keyboard 31 is used. The subscriber keyboard 31 has n subscriber keys 311, and each key 311 has a built-in lamp or light-emitting diode (LED), with the key top thereof being covered with a translucent pad. Each lamp in a key 311 stays lit, flickers and stays off to indicate subscriber states of "busy", "ATT calling" and "idle", respectively. When a subscriber 1-i is in a state where it is being called by a station terminal 9 but not connected to the station terminal 9 (hereinafter referred to as a called state), the lamp in the subscriber key 311 corresponding to the subscriber 1-i lights up to inform the operator of the called state. When the operator presses the lit subscriber key 311, the subscriber 1-i is connected to the ATT 4.

For a PBX 2 accommodating a greater number (n×m) of subscribers 1-i, a BLF with both a subscriber keyboard 31 and a plane-switch keyboard 32 is typically used. The subscriber keyboard 31 has n subscriber keys 311 arranged in a matrix and each key 311 has the above-described construction. Hereinafter, a group of n subscribers 1-i whose subscriber states are displayed on the subscriber keyboard 31 at one time and the subscriber states of the group displayed are both referred to as a plane. The plane-switch keyboard 32 has m plane-switch keys 321 arranged in a line, and each key 321 has the same construction as the keys 311. The plane-switch keys 321 are used to switch between the m different planes which can be displayed on the subscriber keyboard 31, allowing the BLF 3 to display a total of n×m subscriber states for n×m subscribers 1-i.

The following is a description of an example of a BLF 3 with both a subscriber keyboard 31 and a plane-switch keyboard 32. If a call to a subscriber 1-i is suspended and the called state continues for a predetermined time (hereinafter, this subscriber state is called a "recalled state"), the subscriber 1-i is put in the recalled state. If a plurality of subscribers 1-i are to be put in the recalled state, they are put in the recalled state in a system-defined order (e.g., on a first-come, first-served basis). When a subscriber 1-i is in the recalled state, the plane-switch key 321 that corresponds to the plane to which the subscriber 1-i belongs, is lit. Pressing the lit plane-switch key 321 causes the subscriber key 311 corresponding to the subscriber 1-i to light up, thereby informing the operator of the recalled state of the subscriber 1-i. Then, pressing the lit subscriber key 311 connects the suspended call to the subscriber 1-i.

In addition, when a subscriber 1-i is put in the recalled state, a ringer on the ATT 4 rings to call the operator's attention to the recalled state. When the operator presses a "recall" key (not shown) on the ATT 4, the suspended call is connected to the subscriber 1-i.

However, there is a problem with the above-described system in that when a plurality of subscribers 1-i are in the recalled state, the operator can recognize only one recalled state subscriber 1-i. Therefore, there is no room for the operator to recognize and select a subscriber 1-i having a higher priority for connection to a suspended call, from among the remaining recalled state subscribers 1-i.

SUMMARY OF THE INVENTION

It is an object of the present invention to provide an exchange having a busy lamp field (BLF) that can inform the operator of all recalls in addition to incoming calls terminated at an attendant console.

It is another object of the present invention to provide an exchange having a BLF which allows an operator to selectively talk to any of the station line terminals whose call is in the call or recalled state.

To achieve the above and other objects, the present invention provides a BLF which comprises a subscriber keyboard, a plane-switch keyboard and a BLF controller. The subscriber keyboard has n indicator-keys, each for displaying the state of a subscriber terminal. The plane-switch keyboard has m indicator-keys. Each indicator-key, when pressed, selects a group of n subscriber terminals whose states are to be displayed on the subscriber keyboard, thus allowing the BLF to display the states of a total of n×m subscriber terminals. The BLF controller receives subscriber state information from the exchange and controls the BLF to produce a corresponding display. When a subscriber keyboard indicator-key is pressed, the BLF controller sends the key-in information to the exchange to have the specified subscriber terminal and station line connected by the exchange.

These together with other objects and advantages which will be subsequently apparent, reside in the details of construction and operation as more fully hereinafter described and claimed, reference being had to the accompanying drawings forming a part hereof, wherein like numerals referred to like parts throughout.

BRIEF DESCRIPTION OF THE DRAWINGS

FIG. 17 is a flowchart illustrating the processing by the PBX 2 at a time when a subscriber in the recalled state is connected to a suspended call and released from the recalled state; and FIG. 18 is a flowchart illustrating the processing by the PBX 2 at a time when a plane-switch key 321 is pressed to change the plane to be displayed.

DESCRIPTION OF THE PREFERRED EMBODIMENT

Before providing a detailed description of a BLF in accordance with the present invention, a background explanation of termination control performed by using an ATT is provided with reference to FIGS. 2, 3, 4 and 5(a)-5(d).

Figure 1:
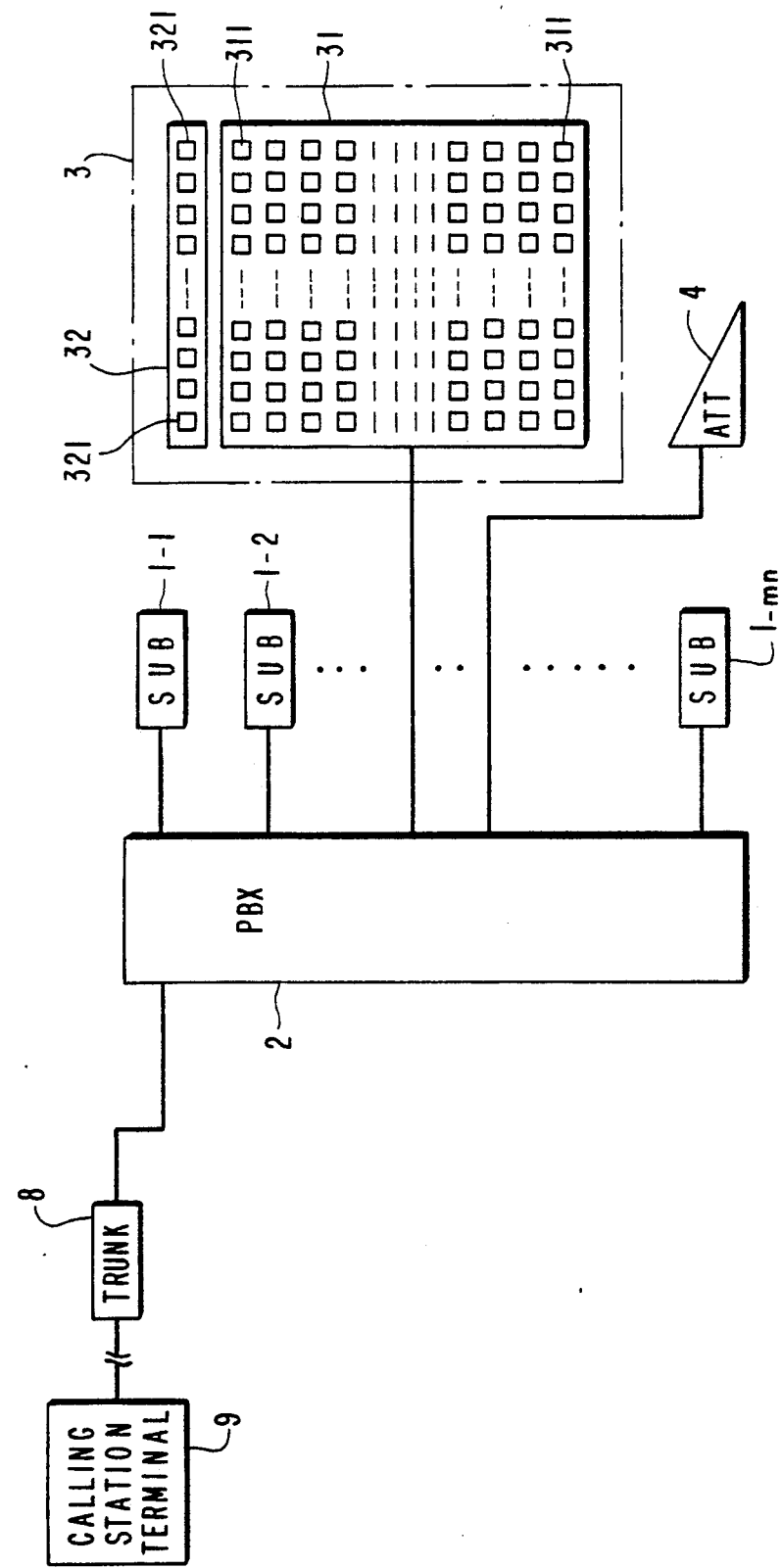
FIG. 1 is a block diagram of an exchange system described above in the Description of the Related Art.
Figure 2:
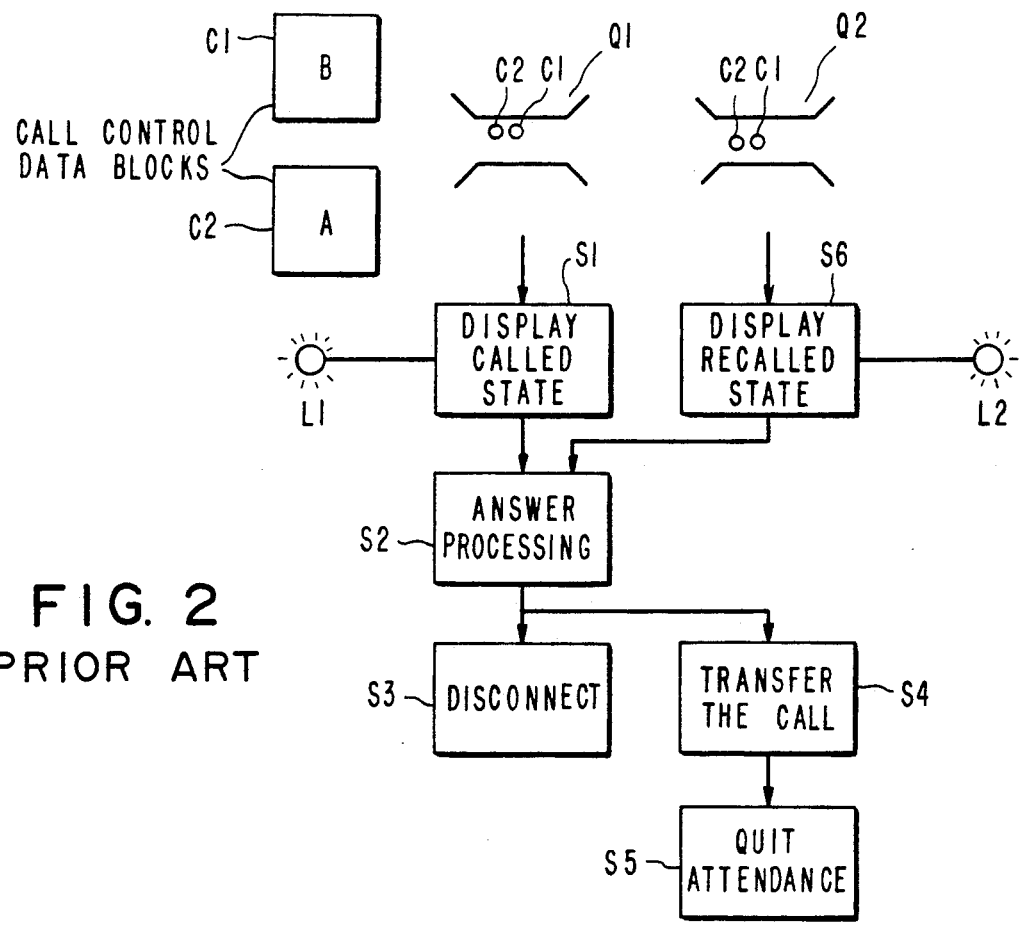
FIG. 2 is a flowchart illustrating a termination control performed by using the ATT 4 of FIG. 1.
Figure 6:
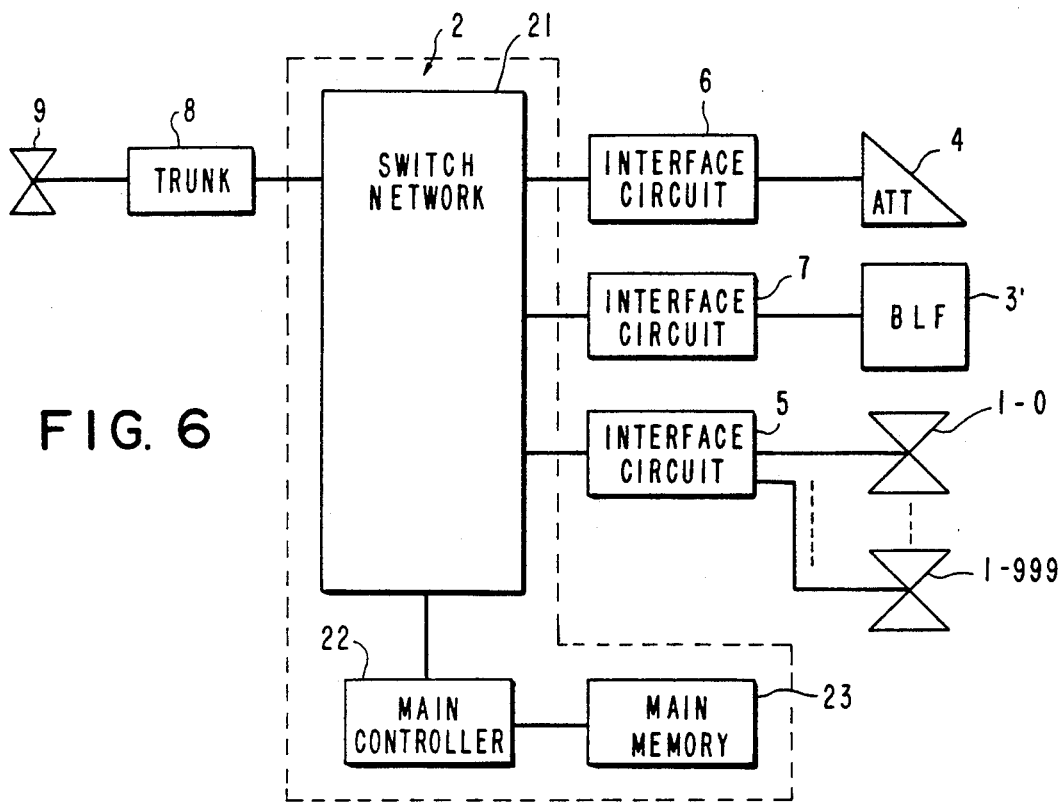
FIG. 6 is a block diagram of a system incorporating the present invention.

FIG. 2 is a flowchart illustrating termination control performed by using an ATT, e.g. ATT 4 of FIG. 1 or FIG. 6.

S1: When incoming calls (e.g., calls A and B) are terminated at an ATT, call control data blocks C1 and C2 corresponding to the calls are attached to a call queue in the order of termination. A PBX main controller 22 (see FIG. 6) performs call processing in which it reads out the call control data blocks one by one from the call queue Q1 and displays an occurrence of a called state on a lamp L1.

S2: When an operator answers the call on an ATT, the main controller 22 performs answer processing, and the operator is allowed to talk during a talk state.

S3: When detecting an end of the talk state, the main controller 23 disconnects the line to release the call.

S4: When so-directed by the operator via the ATT, the main controller 22 transfers the call to the subscriber concerned.

S5: According to the operator's quit-attendance operation (an operation for quitting further attendance on the call after performing such necessary operations as described above in S4), the main controller 22 performs quit-attendance processing.

S6: When a subscriber fails to answer for a predetermined time after the quit-attendance processing or when a subscriber recalls the ATT after answering, the main controller 22 attaches the call control data block (e.g., C1) to a recall queue Q2. Then, the main controller 22 performs recall processing in which it reads out the call control data blocks one by one from the recall queue Q2 and displays an occurrence of a recalled state on a lamp L2.

Figure 3:
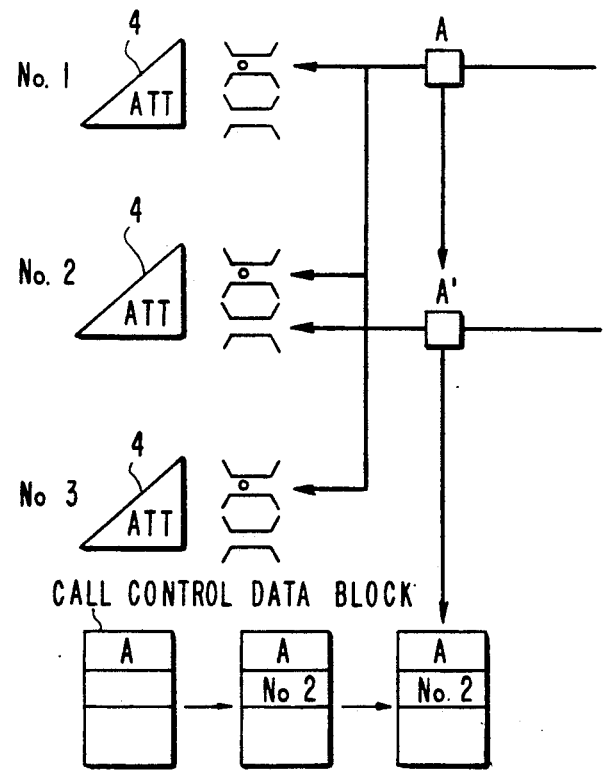
FIG. 3 is a schematic diagram illustrating the relationship between the queues and the call control data blocks in the processing illustrated in the flowchart of FIG. 2.

FIG. 3 is a schematic diagram illustrating the relationship between the queues and the call control data blocks for the processing illustrated in FIG. 2. When a call is terminated at an ATT 4 (FIG. 3 shows an example of a system with a plurality of ATTs 4), the main controller 22 attaches a call control data block for the call to the queue Q1 and lights lamp L1 to display the occurrence of a called state. When an operator answers any of the ATTs 4, the ATT 4 is placed in a talk state. When a recall occurs after the quit-attendance processing and the call is transferred to a subscriber, the main controller 22 attaches the call control data block to the recall queue Q2 for the ATT 4 which answered. The main controller 22 stores the ATT number when it answers the call and the number of a central office line trunk (abbreviated as COT) in the call control data block at termination of a call. If a recall occurs after the quit-attendance processing, the main controller 22 performs recall processing based on the ATT number.

Figure 4:
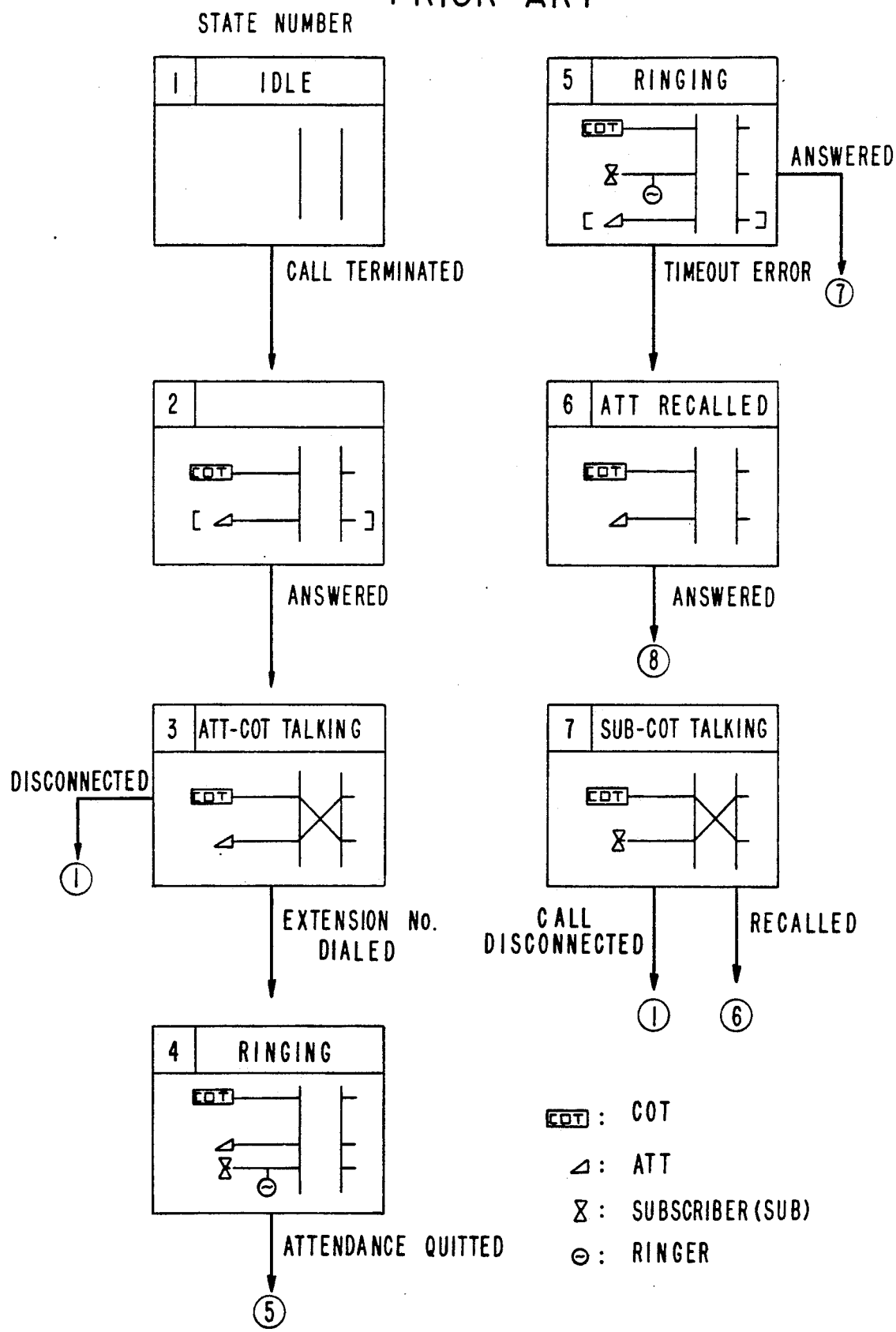
FIG. 4 is a state transition diagram exemplifying the processing shown in FIGS. 2 and 3.
Figure 5A:
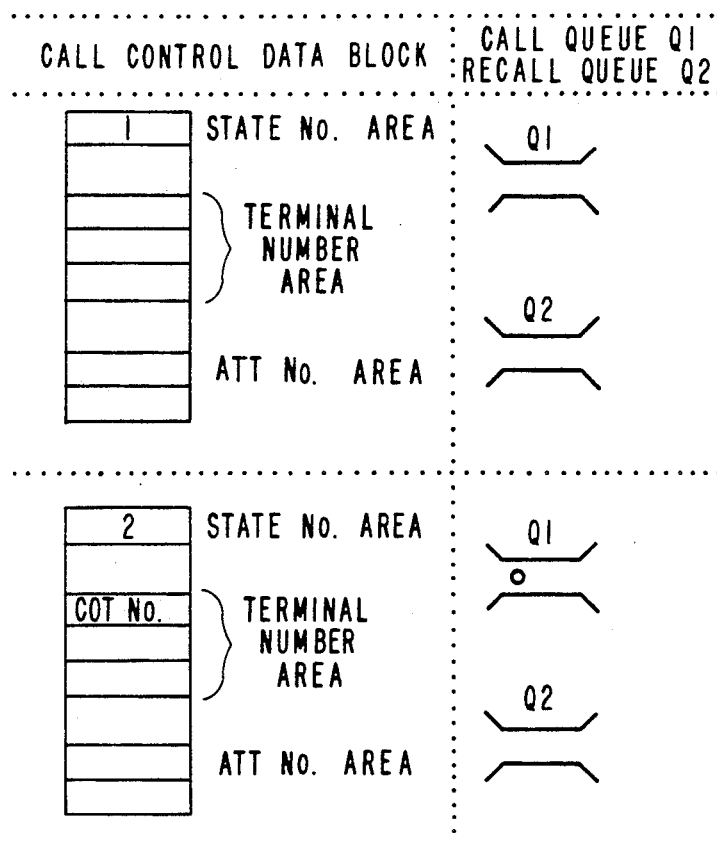
FIGS. 5(a), 5(b), 5(c) and 5(d) are diagrams illustrating the conditions of the call control data block and queues for each state shown in FIG. 4.
Figure 5B:
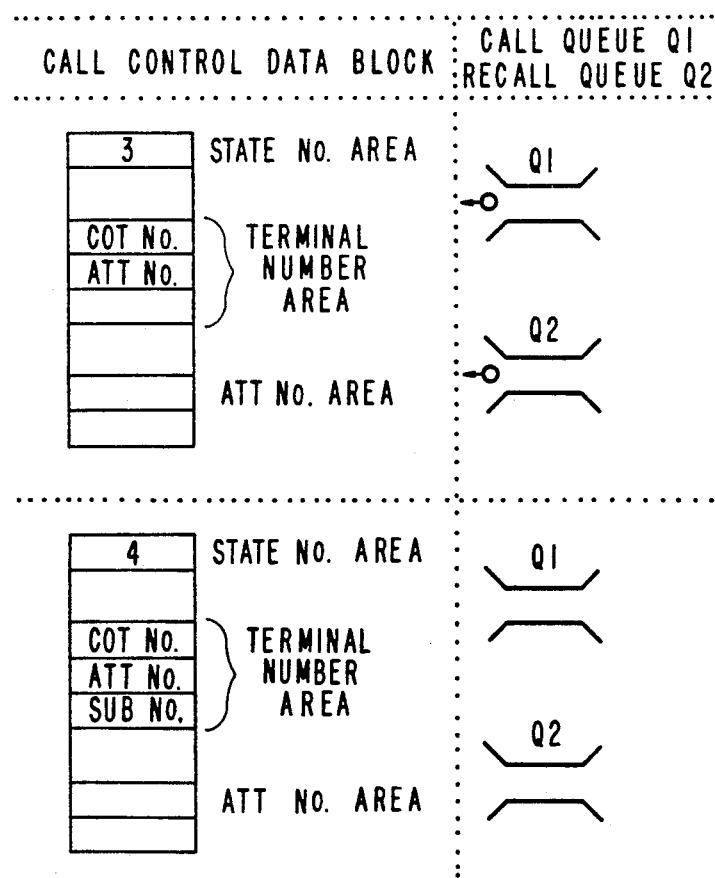
Figure 5C:
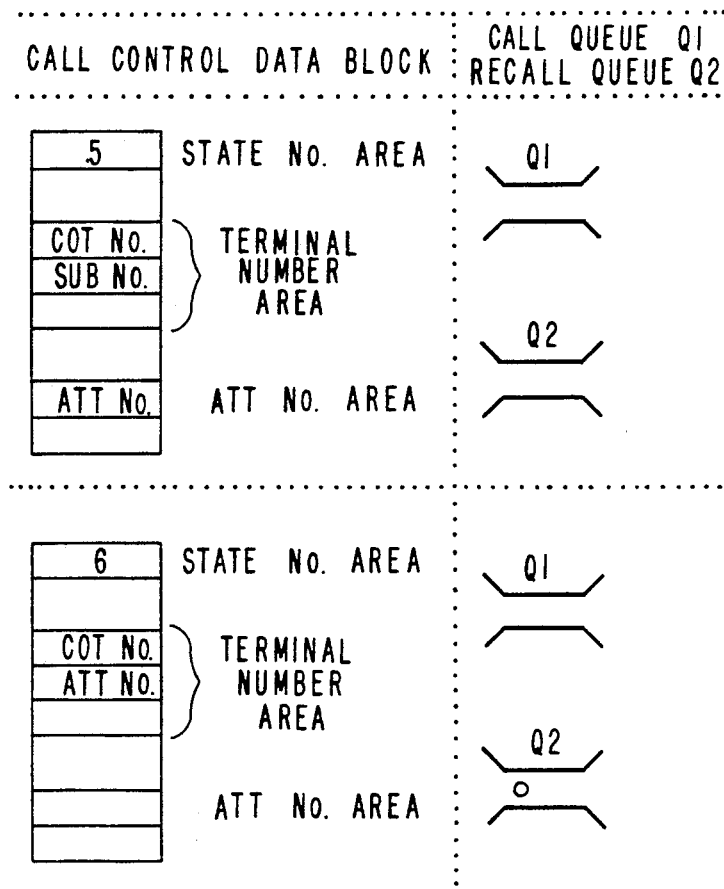
Figure 5D:
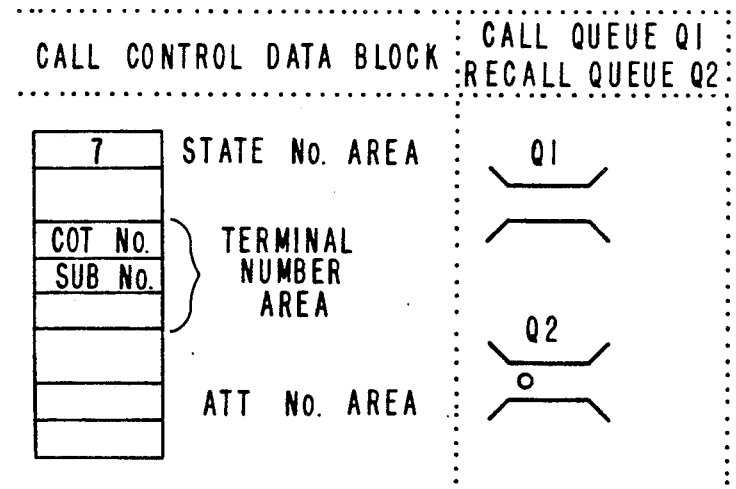

FIG. 4 is a state transition diagram exemplifying the processing shown in FIGS. 2 and 3, and FIGS. 5(a)-5(d) illustrate the conditions of the call control data block and queues for each state shown in FIG. 4.

State 1 is an idle state where no incoming call is terminated. A call terminated in state 1 causes the state to transfer to state 2.

State 2 is a state where an ATT 4 is displaying a call terminated. When a call is terminated at an ATT 4, the COT number is stored in the terminal number area of the call control data block and the data block data is attached to the call queue Q1 (see FIG. 5(a)). When an ATT 4 answers in state 2, the state is transferred to state 3.

State 3 is a state where the ATT 4 and COT are in a talk state. When an ATT 4 answers, the ATT number is stored in the terminal number area and the call control data is detached from the call queue Q1 or recall queue Q2. When quit-attendance processing is performed in state 3 or the call is disconnected, the state is transferred to state 1 to perform the quit-attendance processing. When an ATT 4 dials an extension number in state 3 the state is transferred to state 4.

State 4 is a state where ATT 4 is ringing a subscriber. When an ATT 4 dials an extension number, the subscriber number is stored in the terminal number area. When quit-attendance processing is performed while a subscriber is being rung in state 4, the state is transferred to state 5.

State 5 is a state where ATT 4 is ringing a subscriber. When quit-attendance processing is performed, the ATT number is moved from the terminal number area to the ATT number area for the ATT 4 that answered, for use in recall processing. A subscriber's failure to answer for a predetermined time (timeout error) in state 5 causes the state to transfer to state 6. If the subscriber answers in state 5 before the predetermined time the state is transferred to state 7.

State 6 is a state where the ATT 4 is recalled. When a timeout error occurs, the ATT number is moved from the terminal number area to the ATT number area. When the ATT answers in state 6 the state is transferred to state 3.

State 7 is a state in which a subscriber and a COT are talking. When a subscriber disconnects the line in state 7 after calling an ATT 4, the state is transferred to state 6. When an incoming call is disconnected in state 7 the state is transferred to state 1 to perform the quit-attendance processing.

The present invention facilitates selectively answering any call and recall in the above-mentioned termination control.

A BLF 3' in accordance with the present invention is described below with reference to FIGS. 6-15. A private branch exchange (PBX) 2 accommodates e.g., 1000 subscribers 1-i (i=0 to 999) with extension numbers i assigned. One of the subscribers is an ATT 4 (whose extension number is 200, for example) having a control panel as shown in FIG. 8.

Referring to FIG. 6, the PBX 2, which includes a switch network 21, main controller 22 and main memory 23, is connected to the subscribers 1-i, ATT 4 and BLF 3' via respective interface circuits 5, 6 and 7, and is connected to station terminals 9 via trunk 8.

Figure 7:
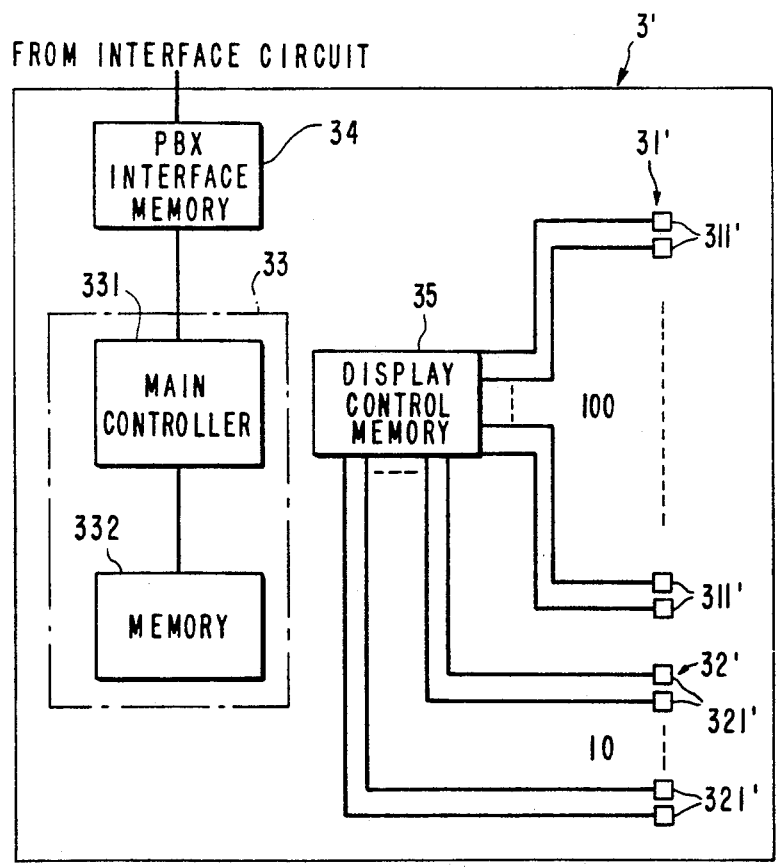
FIG. 7 is a block diagram of a BLF 3' in accordance with the present invention.
Figure 8:
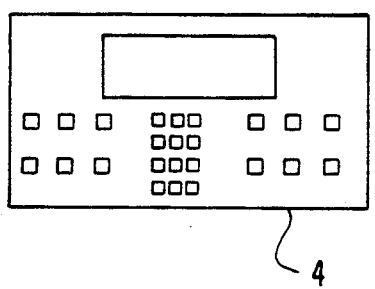
FIG. 8 is a front view of the control panel of the ATT 4 of FIG. 6.

As shown in FIG. 7, a BLF 3' which is attached to the PBX 2, includes a subscriber keyboard 31', plane-switch keyboard 32', display controller 33, PBX interface memory 34 and display control memory 35.

Figure 9:
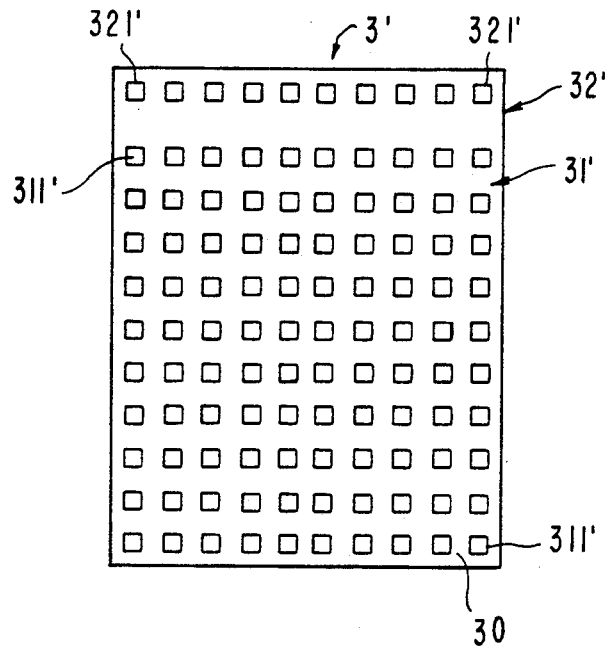
FIG. 9 is a front view of the operator panel of a BLF 3' in accordance with the present invention.

As shown in FIG. 9, the BLF 3' has a plane-switch keyboard 32' and a subscriber keyboard 31' arranged respectively on the upper and lower sides of a panel 30. The plane-switch keyboard 32' and subscriber keyboard 31' respectively have plane-switch keys 321' and subscriber keys 311'. Each of the keys 311' and 321' has a built-in lamp or LED which is covered with a translucent pad.

The subscriber keyboard 31' has 100 subscriber keys 311' arranged in a 10-by-10 matrix, for displaying subscriber states for 100 subscribers 1-i. The plane-switch keyboard 32' has 10 plane-switch keys 321' arranged in a line. When pressed, each of the plane-switch keys 321' causes the subscriber keyboard 31' to display the subscriber states of a group of 100 subscribers 1-i, thus allowing the BLF 3' to selectively display the subscriber states of a total of 1000 (100×10) subscribers 1-i. Hereinafter a group of 100 subscribers 1-i to be displayed on the subscriber keyboard 31' at one time or the subscriber states of the group displayed are referred to as a plane.

Figure 10:
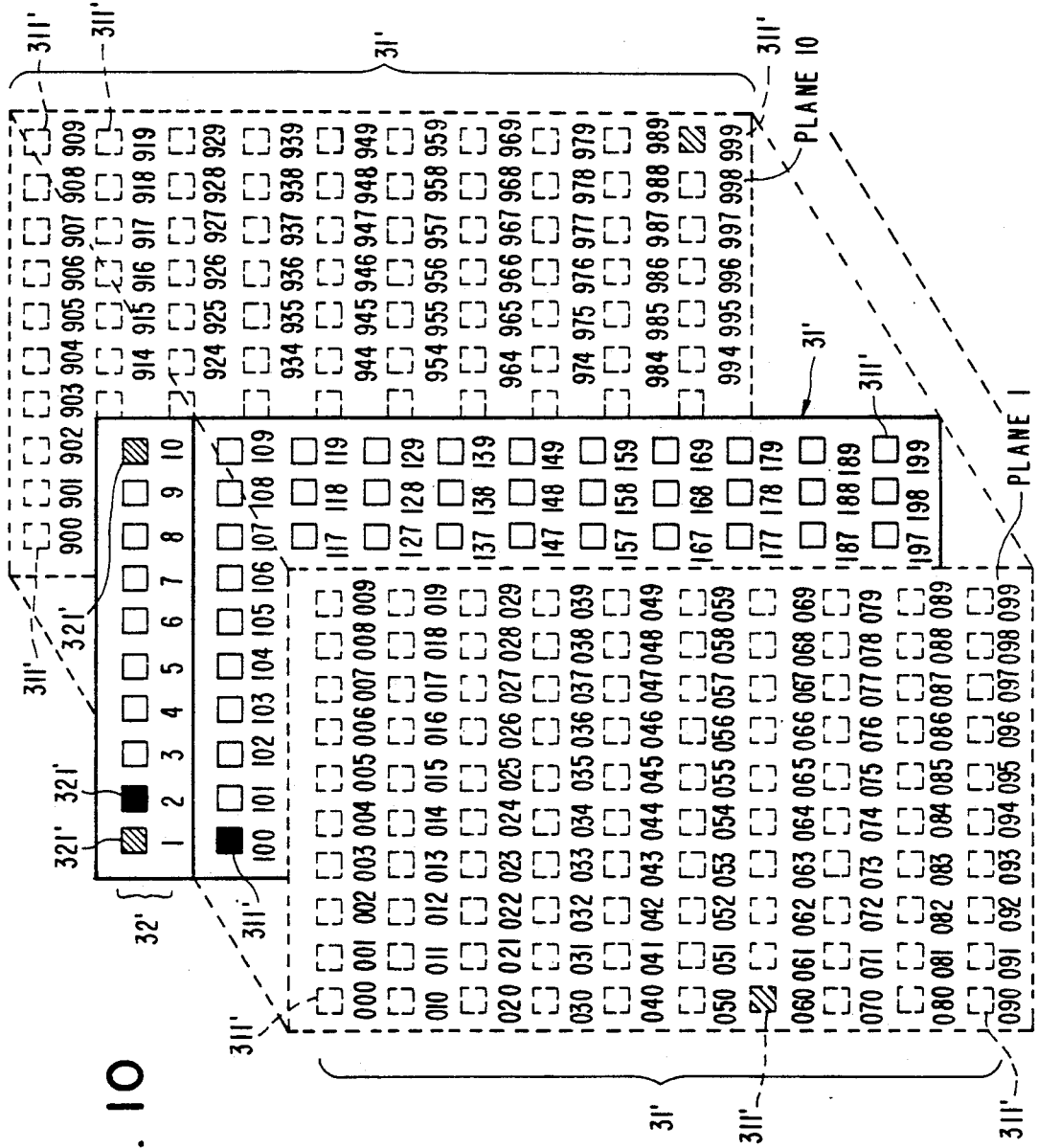
FIG. 10 is a diagram illustrating the concept of the subscriber planes.

Referring to FIG. 10 which is a diagram illustrating the concept of the planes, the subscriber keyboard 31' and plane-switch keyboard 32' are enclosed in solid lines and the planes 1-10 are enclosed in dotted lines. For example, when the leftmost plane-switch key 321' which corresponds to plane 1 is pressed, the subscriber keyboard 31' displays the subscriber states of the subscribers 1-000 to 1-099. When the second plane-switch key 321' from the left which corresponds to plane 2 is pressed, the subscriber keyboard 31' displays the subscriber states of the subscribers 1-100 to 1-199. (FIG. 10 shows a case where plane 2 is displayed.) In the same way, when the tenth plane-switch key 321' is pressed, the subscriber keyboard 31' displays the subscriber states of the subscribers 1-900 to 1-999.

In FIG. 7, a display controller 33 includes a main controller 331 and a memory 332. The display controller 33 lights the plane-switch keys 321' and subscriber keys 311' based on the display mode data from the PBX 2. Based on the operator's depression of the plane-switch keys 321' and subscriber keys 311', display controller 33 sends the connection control data for connecting a call to a subscriber 1-i to the PBX 2. Display controller 33 also displays a recalled state on the plane-switch key 321' corresponding to the plane to which a recalled state subscriber 1-i belongs. In this embodiment, the plane-switch keys 321' and subscriber keys 311' stay lit to display the called state, and flicker on and off at a time interval of 0.5 seconds to display a recalled state, based on display mode data from a display control memory 35.

A PBX interface memory 34 is used for interchanging display mode data and connection control data between the PBX 2 and the display controller 33. The display control memory 35 is used for interchanging display mode data and connection control data between the display controller 33 and the plane-switch keyboard 32' and subscriber keyboard 31'.

Figure 11:
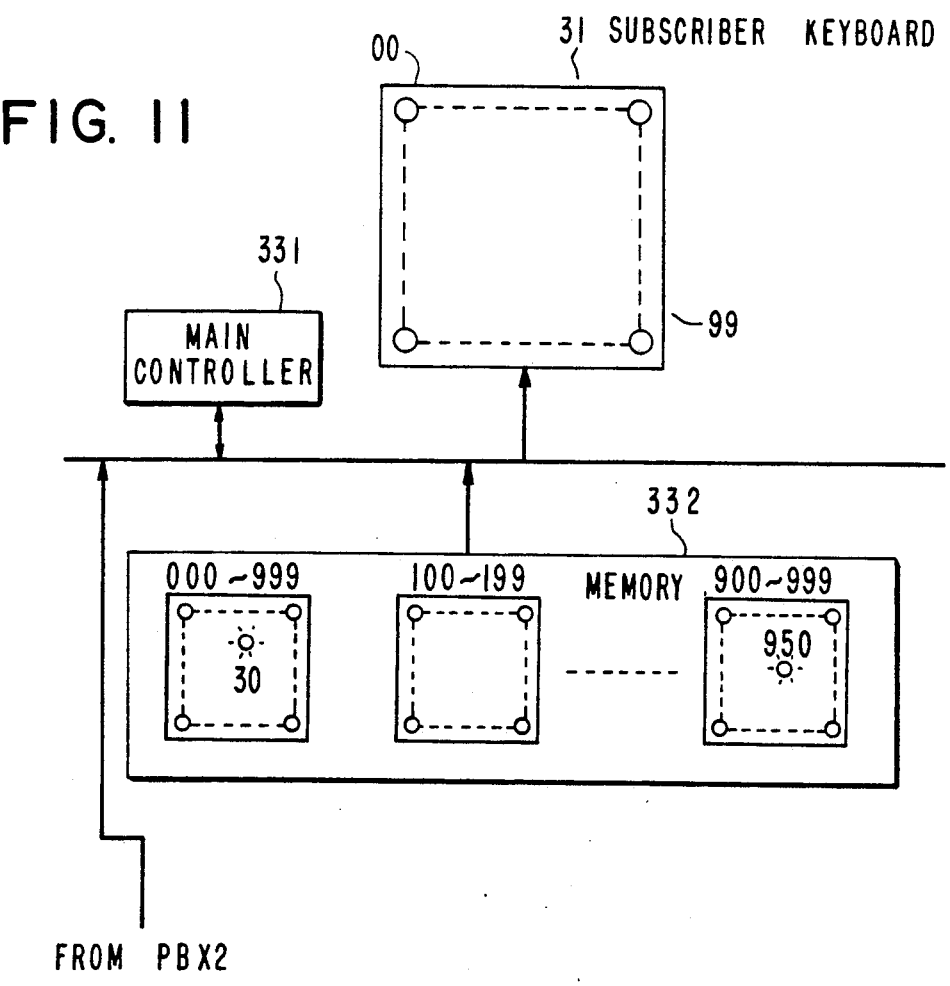
FIG. 11 is a schematic diagram illustrating the relationship between the subscriber planes and the subscriber keyboard.

FIG. 11 is a schematic diagram illustrating the relationship between the planes and the subscriber keyboard. The subscriber state data is transferred from the PBX 2 and stored in the memory 332 of the display controller 33 (see FIG. 7) in units of planes. When a plane-switch key 321' is pressed, the main controller 331 reads from the memory 332 the subscriber state data of the plane corresponding to the plane-switch key 321' which is pressed and displays the data on the subscriber keyboard 31'.

Figures 12A, 12B:
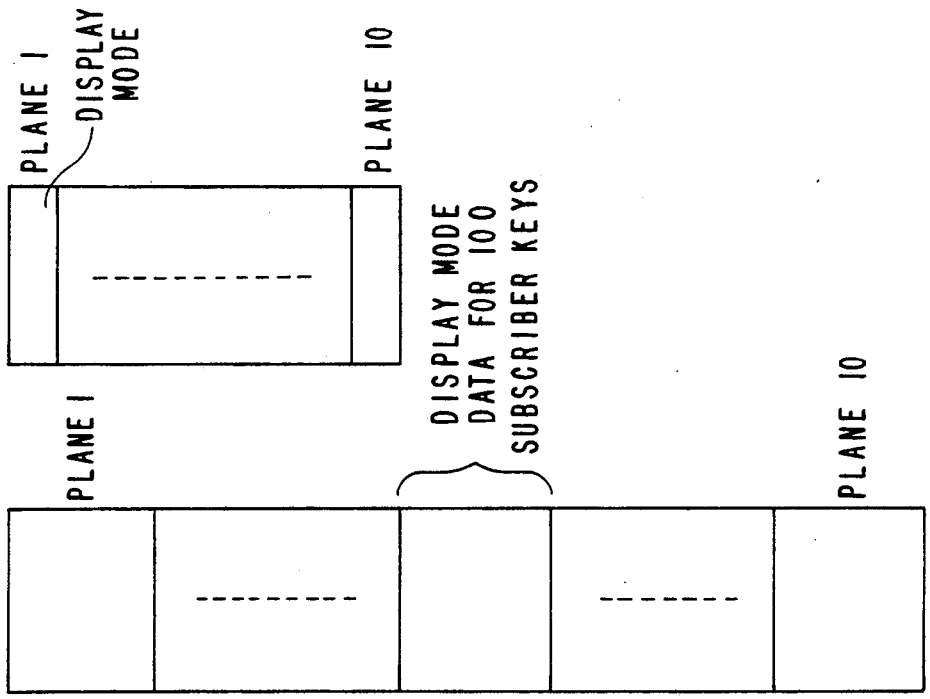
FIGS. 12(a) and 12(b) are diagrams of a memory layout of the PBX main memory 23 of FIG. 6.

FIGS. 12(a) and 12(b) show a memory layout of the PBX main memory 23. The main memory 23 of the PBX 2 stores display mode data and subscriber (or extension) number in pairs (see FIG. 12(a)) for each subscriber key 311', in units of 100 subscriber keys 311' each for a plane (i.e., for a total of 1000 subscriber keys 311' for 10 planes). The main memory 23 also stores display mode data for the 10 plane-switch keys 321' (see FIG. 12(b)).

Figures 13A, 13B:
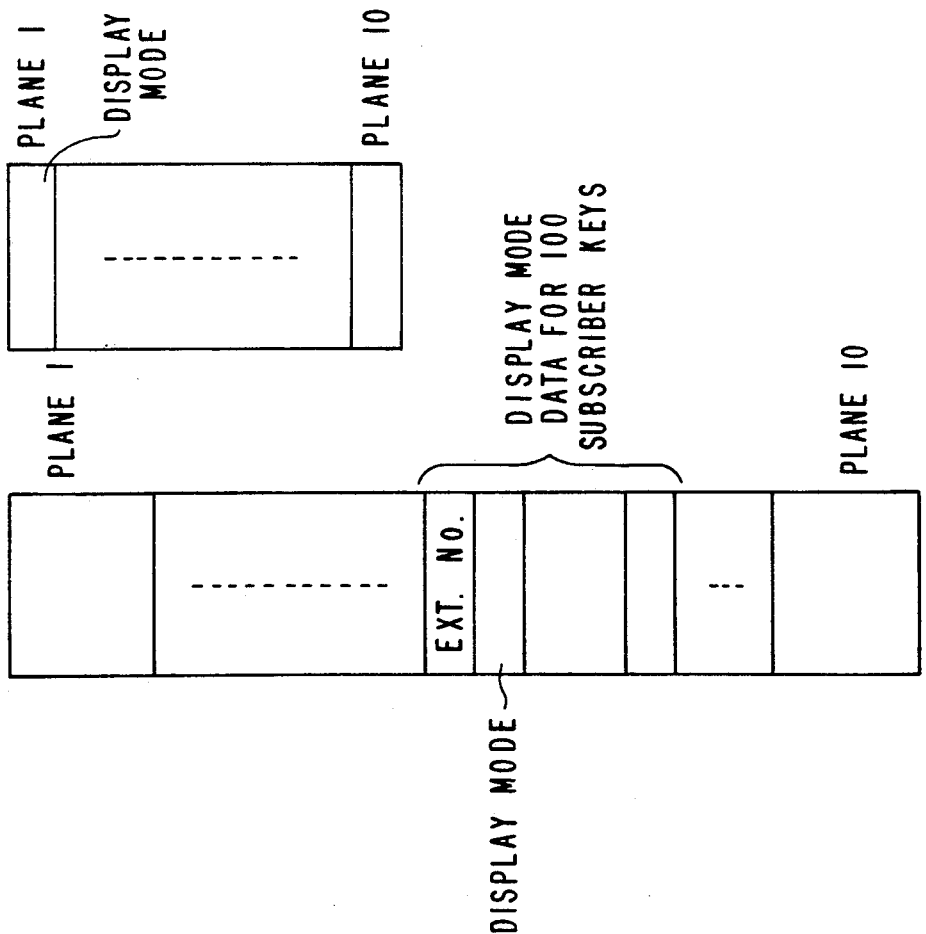
FIGS. 13(a) and 13(b) are diagrams of a memory layout of the BLF memory 332 of FIG. 7.
Figure 14:
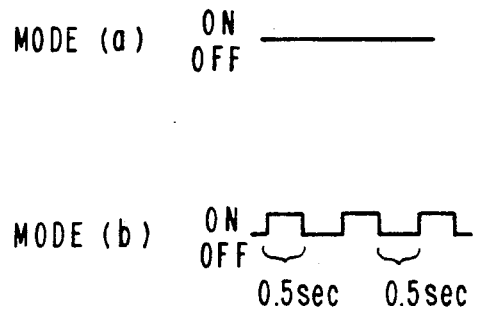
FIG. 14 is a diagram illustrating the display modes in accordance with the present invention.

FIGS. 13(a) and 13(b) show a memory layout of the BLF memory 332. In association with the PBX main memory 23, the memory 332 (see FIG. 7) of the BLF 3' stores display mode data for the 1000 subscriber keys 311' (see FIG. 13(a)) and display mode data for the 10 plane-switch keys 321' (see FIG. 13(b)).

Figure 15:
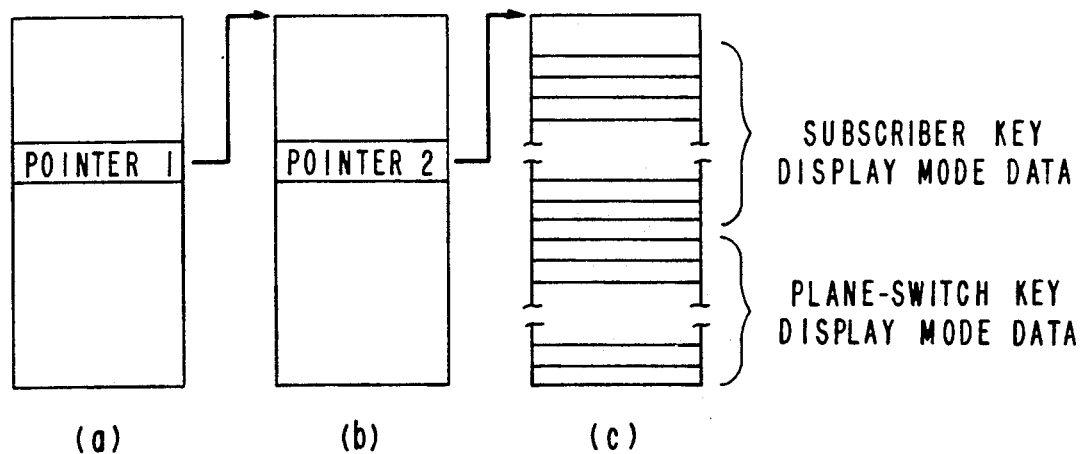
FIG. 15 is a diagram of a data structure of the PBX main memory 23 of FIG. 6.

FIG. 15 is a diagram of a data structure of the PBX main memory 23. The PBX main memory 23 includes three areas: an ATT subscriber data area (a) for controlling the ATT 4, a BLF subscriber data area (b) for controlling the BLF 3' and a BLF display mode data area (c) for displaying the subscriber state on the BLF 3'. The areas (a) and (b) include pointer 1 and pointer 2, respectively to facilitate a change in the number and type of the subscribers 1-i. When a call to a subscriber 1-i is terminated at the ATT 4 or suspended for a predetermined time, the PBX 2 accesses the area (c) via pointers 1 and 2 to update the display mode data for the subscriber 1-i as follows. First, the PBX 2 reads the pointer 1 which designates the starting address of the area (b) from the address obtained by using the extension number of the subscriber 1-i as an index. Second, the PBX 2 reads the pointer 2 which designates the starting address of the area (c) from the address obtained by using the pointer 1 as an index. Finally, the PBX 2 searches the desired display mode data in the area (c) by comparing the extension number with that stored in the area (c) (see FIG. 12(a)). The PBX 2 periodically transfers the display mode data in the area (c) to the PBX interface memory 34 (see FIG. 7) of the BLF 3'.

Thus, when a subscriber 1-i enters the called state, the plane-switch key 321' designating the plane to which the subscriber 1-i belongs lights up. Pressing the lit plane-switch key 321' lights up the subscriber key 311' corresponding to the subscriber 1-i to inform the operator of the called state. Then, pressing the lit subscriber key 311' connects the suspended call to the subscriber 1-i. For example, when subscriber 1-100 enters the called state, the plane-switch key 321' designating plane 2 and the subscriber key 311' designating subscriber 1-100 both (shaded in FIG. 10) light up and stay lit as shown in the display mode (a) in FIG. 14.

After being kept in the called state for a predetermined time, a subscriber 1-i is put in the recalled state. The ringer of the ATT 4 rings and the plane-switch key 321' designating the plane to which the subscriber 1-i belongs flickers on and off to indicate that the subscriber 1-i is in the recalled state. For example, if subscriber 1-999 enters the recalled state, the plane-switch key 321' (hatched in FIG. 10) designating plane 10 flickers on and off as shown in the display mode (b) in FIG. 14. Thus, when the operator presses the flickering plane-switch key 321', display of the subscriber keyboard 31' switches over to plane 10 and the subscriber key 311' (shaded in FIG. 10) corresponding to the subscriber 1-999 flickers on and off as shown in the display mode (b) in FIG. 14. When the operator presses the flickering subscriber key 311', the suspended call is connected to the subscriber 1-999 and the calling station terminal 9 is placed in a talk mode. Then, the subscriber 1-999 is released from the recalled state.

In the same way, when a plurality of subscribers 1-i belonging to different planes enter the recalled state at the same time, a plurality of plane-switch keys 321' designating the planes which correspond to the recalled state subscribers 1-i flicker on and off. For example, when subscriber 1-060 enters a recalled state following subscriber 1-999, the plane-switch key 321' (hatched in FIG. 10) designating the plane 1 flickers on and off, too. That is, the plane-switch keys 321' designating both plane 10 and plane 1 flicker on and off. The operator can select and press either plane-switch key 321'. If the plane-switch key 321' designating plane 1 which has started flickering later than that for plane 10, is pressed first, the display of the subscriber keyboard 31' switches over to plane 1, and the subscriber key 311' corresponding to the subscriber 1-060 flickers on and off. When the operator presses the flickering subscriber key 311', the suspended call is connected to the subscriber 1-060 and the calling station terminal 9 is placed in a talk mode before the subscriber 1-999. Then, the subscriber 1-060 is released from the recalled state. Thus, even when the recall state occurs at the same time for a plurality of subscribers 1-i, the operator can recognize which subscribers 1-i are in the recalled state and select any one of the subscribers for connection to a calling station terminal 9.

Figure 16:
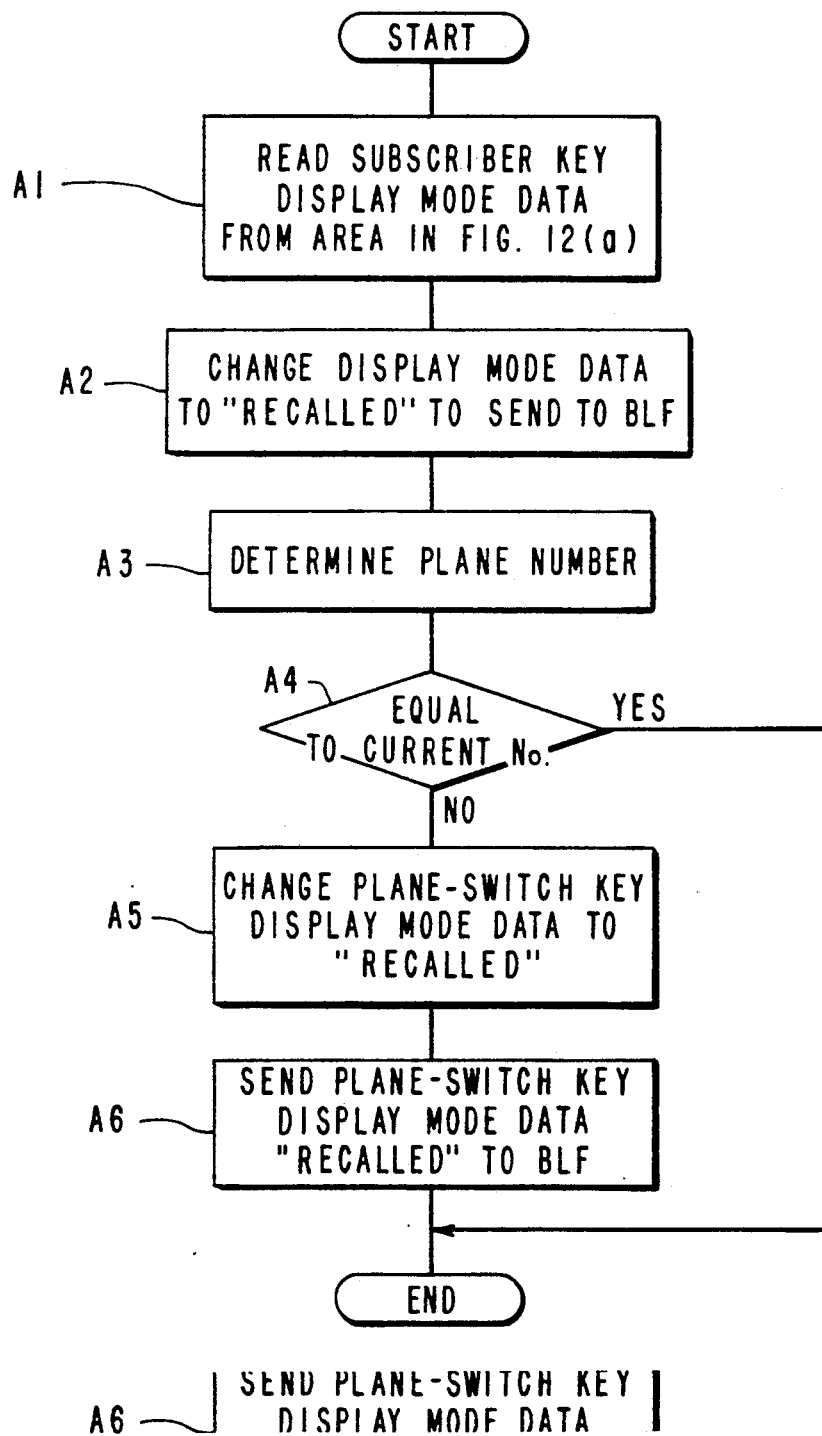
FIG. 16 is a flowchart illustrating the processing by the PBX 2 at a time when a subscriber enters the recalled state.

FIG. 16 is a flowchart illustrating the processing by the PBX 2 at a time when a subscriber 1-i enters the recalled state.

A1: The subscriber key display mode data for the recalled subscriber 1-i is read from the area shown in FIG. 12(a) of the PBX main memory 23, according to the procedure described above with respect to FIG. 15.

A2: The display mode data is changed to a recalled state and the changed data is written in the area shown in FIG. 12(a). The recalled state data is sent to the BLF 3' as the subscriber key display mode data.

A3: The plane number to which the display mode data read in step A1 belongs, is determined.

A4: It is determined whether the plane number determined in step A3 is equal to that of the plane currently being displayed. If equal, the processing is ended without executing steps A5 and A6. Thus, only the specified subscriber key 311' flickers (but not the plane-switch key 321').

A5: If the plane number determined in step A3 is not equal to that of the plane currently being displayed, the plane-switch key display mode data of the plane number is changed to a recalled state and the changed data is written in the area shown in FIG. 12(b).

A6: The recalled state data is sent to the BLF 3' as the plane-switch key display mode data. Thus, both the PBX-designated designated plane-switch key 321' and the subscriber key 311' flicker to inform the operator of the recalled state.

FIG. 17 is a flowchart illustrating the processing by the PBX 2 at a time when a recalled state subscriber 1-i is connected to the call and released from the recalled state.

B1: The subscriber key display mode data for the subscriber 1-i is read from the area shown in FIG. 12(a) according to the procedure described above with respect to FIG. 15.

B2: The display mode data is changed to an idle state and the changed data is written in the area shown in FIG. 12(a). The idle-state data is sent to the BLF 3' as the subscriber key display mode data.

B3: The plane number to which the display mode data read in step Al belongs, is determined.

B4: The plane number determined in step B3 is checked to determine if it is equal to that of the plane currently being displayed. If equal, the processing is ended without executing steps B5 and B6. Thus, the flickering subscriber key 311' concerned turns off. It should be noted that plane-switch key 321' is not flickering in this case.

B5: If the plane number determined in step B3 is not equal to that of the plane currently being displayed, the plane-switch key display mode data of the plane number is changed to an idle state and the changed data is written in the area shown in FIG. 12(b).

B6: The idle-state data is sent to the BLF 3' as the plane-switch key display mode data. Thus, both the flickering plane-switch key 321' and the subscriber key 311' concerned turn off.

FIG. 18 is a flowchart illustrating the processing by the PBX 2 at a time when a plane-switch key 321' is pressed to change the plane to be displayed.

C1: The plane number corresponding to the plane-switch key 321' pressed is received from the BLF 3'.

C2: It is determined whether the plane number received is equal to that of the plane currently being displayed.

C3: If the plane numbers are not equal, the plane number to be switched to and the plane-switch key display mode data to be displayed are sent to the BLF 3'.

C4: It is determined if a recalled state subscriber key 311' is present in the plane formerly displayed. If it is not present, processing branches to step C7.

C5: If the recalled state subscriber key 311' is present, the plane-switch key display mode data (see FIG. 12(b)) is set to a recalled state for the plane formerly displayed.

C6: The recalled state data is sent to the BLF 3' as the plane-switch key display mode data for the plane formerly displayed.

C7: The plane-switch key display mode data is set to an idle state for the plane formerly displayed.

C8: The idle-state data is sent to the BLF 3' as the plane-switch key display mode data for the plane formerly displayed.

When an operator presses a plane-switch key 321', the display controller 33 of BLF 3' sends to the PBX 2 the information for the key which has been pressed. The PBX 2, in return, sends to the BLF 3' the plane number to be switched to, and the display mode data to be displayed, according to the procedure described in FIG. 18. Based on the data from the PBX 2, the BLF 3' switches the planes and displays the display mode data on the plane-switch keyboard 32' and the subscriber keyboard 31'.

As described above, even when a plurality of subscribers 1-i enter the recalled state at the same time, the present invention allows the operator to recognize which subscribers 1-i are in the recalled state and to selectively connect any suspended call to the calling station terminal.

In the above description, the subscriber keys 311' and plane-switch keys 321' stay lit and flicker to display the called and recalled states, respectively. However, other methods may be used to display these states in accordance with the present invention. For example, keys 311' and 321' may be flickered at the same time interval of 0.5 seconds, for example, and the called and recalled states may be distinguished by "called" and "recalled" lamps (not shown in the figures) which are provided on the ATT 4. Further, the keys may be flickered at intervals of 1 second and 0.5 seconds, for example, to distinguish the called and recalled states, respectively. Another possible modification would be to display the keys in different colors to distinguish the two states.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, as falling within the scope of the invention.

What is claimed is:

1. In an exchange having an attendant console and accommodating a plurality of groups of subscriber terminals, a display apparatus for displaying a call terminated at the attendant console, each of the groups of subscriber terminals including a predetermined number of subscriber terminals, said display apparatus comprising:

display means for displaying a call for one of the predetermined number of subscriber terminals in one of the groups of subscriber terminals; and indication means for indicating each group to which one of the subscriber terminals which terminates a call, belongs.

2. A display apparatus in an exchange according to claim 1, wherein said display means includes means for displaying a recall terminated at the attendant console.

3. A display apparatus in an exchange according to claim 1, wherein said display means includes means for displaying a first incoming call terminated at the attendant console.

4. A display apparatus in an exchange according to claim 1, wherein the exchange has a memory for storing call state data, wherein each of the subscriber terminals has an extension number, wherein said display means includes a plurality of indicators for displaying a call state corresponding to the extension numbers, wherein the number of said indicators is less than or equal to the number of the extension numbers, and wherein said indicators are actuated to provide a display based on the call state data stored in the main memory of said exchange.

5. A display apparatus in an exchange according to claim 4, wherein said display means includes means for controlling said indicators to turn off, stay lit or flicker in accordance with the call state of the corresponding extension numbers.

6. A display apparatus in an exchange according to claim 5, wherein said display means comprises busy lamp field equipment.

7. A display apparatus in an exchange according to claim 1, wherein said indication means includes a plurality of indicators, respectively corresponding to the groups of the subscriber terminals, said indication means controlling at least one of said indicators to flicker on and off when at least one recall is terminated at the attendant console for one of the subscriber terminals of the group corresponding to said at least one of said indicators.

8. A display apparatus in an exchange according to claim 2, wherein the recall occurs when a specified subscriber terminal does not answer an incoming call for a predetermined time after the attendant console transfers the incoming call to the specified subscriber terminal.

9. A display apparatus in an exchange according to claim 2, wherein the recall occurs when a specified subscriber terminal calls the attendant console after the specified subscriber terminal answers an incoming call transferred by the attendant console.

10. A display apparatus in an exchange according to claim 2, wherein the exchange includes a plurality of attendant consoles, and wherein the recall is made to the one of the attendant consoles that has answered the incoming call.

11. In an exchange having an attendant console and accommodating a plurality of groups of subscriber terminals, a display apparatus for displaying a call terminated at the attendant console, each of the groups of subscriber terminals including a predetermined number of subscriber terminals, said display apparatus comprising:

an interface circuit coupled to the exchange;

a subscriber terminal display device, coupled to the exchange via said interface circuit, for displaying idle, busy and calling states, said subscriber terminal display device including:

display means for displaying a call for one of the predetermined number of subscriber terminals in one of the groups of subscriber terminals; and indication means for indicating each group to which one of the subscriber terminal which terminates a call at the attendant console, belongs.

12. A display apparatus in an exchange according to claim 11, wherein the exchange includes a memory for storing call state data for the subscriber terminals and a call control data block, wherein the call control data block includes a first queue for linking an incoming call and a second queue for linking a recall, and wherein said display means includes means for displaying a recall state based on the recall data in the second queue.

13. A display apparatus in an exchange according to claim 12, wherein each of said display means and said indication means includes indicators, and wherein the recall state is displayed by flickering selected ones of said indicators on and off.

14. A display apparatus in an exchange according to claim 12, wherein said indication means continues to display a recall state if another recall is present in the second queue for the group of subscriber terminals whose states are being displayed on said display means when the attendant console answers a prior recall displayed on said display means.

15. A display apparatus, coupled to an exchange having an attendant console, for displaying the call states of a plurality of subscriber terminals accommodated in the exchange, said display apparatus comprising:

display means having n indicators, each for displaying the call state of a subscriber terminal;

indication means having m indicators, each for selectively indicating the call state of a group of n subscriber terminals, so that the call states of a total of n×m subscriber terminals can be selectively displayed, where n and m are integers; and a display controller coupled to the exchange, said display means and said indication means, to display a call from a selected subscriber terminal to the attendant console on the one of said m indicators of said indication means which corresponds to the group of subscriber terminals including the selected subscriber terminal.

16. A display apparatus according to claim 15, wherein the call is a recall to the attendant console.

17. A display apparatus according to claim 15, wherein the call is a first incoming call terminated at the attendant console.

18. A display apparatus according to claim 15, wherein the exchange includes a main memory for storing call state data, wherein said m indicators respectively display call states corresponding to the subscriber terminal extension numbers, wherein n is less than or equal to the number of extension numbers, and wherein said n indicators provide a display based on the call state data stored in the main memory of said exchange.

19. A display apparatus according to claim 18, wherein said display means includes means for turning off, keeping lit and flickering said n indicators in accordance with the call state of the subscriber terminals.

20. A display apparatus according to claim 19, wherein said display means comprises busy lamp field equipment.

21. A display apparatus according to claim 15, wherein said m indicators of said indication means flicker on and off when a call is terminated to any of the subscriber terminals of the corresponding group.

22. A display apparatus, coupled to an exchange having an attendant console and accommodating a plurality of groups of subscriber terminals, each of the groups of subscriber terminals including a predetermined number of subscriber terminals, said display apparatus comprising:

extension display means including n visual indicators for displaying the call state of n subscriber terminals within a selected one of the groups of subscriber terminals;

group indication means including m visual indicators for indicating the call state of each of the n groups of subscriber terminals, each of said n visual indicators and said m visual indicators being capable of providing first, second and third visual signals corresponding to first, second and third call states, respectively.

23. A display apparatus according to claim 22, wherein said first, second and third call states correspond to idle, called and recalled states.

24. The display apparatus according to claim 23, wherein each of said m visual indicators and said n visual indicators which is providing the third visual signal indicating the recalled state may be selectively actuated by an operator to connect the corresponding one of said subscriber terminals to a suspended call.

25. An exchange for accommodating a plurality of subscriber terminals and for facilitating a termination of a call to a selected one of the plurality of subscriber terminals, comprising:

a display apparatus including:

display means for displaying a recall state of the selected one of plurality of subscriber terminals, and indication means for indicating a selected one of a plurality of groups of the plurality of subscriber terminals, which includes the selected one of the plurality of subscriber terminals;

a private branch exchange coupled to said display apparatus, for receiving a call to the selected one of the plurality of subscriber terminals; and an attendant console coupled to said private branch exchange, for receiving a call from said private branch exchange, for receiving a recall from one plurality of subscriber terminals and for transferring the recall to one of the plurality of subscriber terminals.

* * * * *